(12) United States Patent  
Dupont de Dinechin

(10) Patent No.: US 7,177,893 B2
(45) Date of Patent: Feb. 13, 2007

(54) HIGH-EFFICIENCY SATURATING OPERATOR

(75) Inventor: Benoît Dupont de Dinechin, Grenoble (FR)

(73) Assignee: STMicroelectronics S.A., Montrouge (FR)

( * ) Notice: Subject to any disclaimer, the term of this patent is extended or adjusted under 35 U.S.C. 154(b) by 579 days.

(21) Appl. No.: 10/360,831

(22) Filed: Feb. 7, 2003

(65) Prior Publication Data

US 2003/0169077 A1 Sep. 11, 2003

(30) Foreign Application Priority Data

Feb. 8, 2002 (FR) .................................. 02 01569

(51) Int. Cl.
*G06F 7/50* (2006.01)
(52) U.S. Cl. ..................................... 708/552
(58) Field of Classification Search .............. 708/552, 708/498
See application file for complete search history.

(56) References Cited

U.S. PATENT DOCUMENTS

| | | | |
|---|---|---|---|
| 4,215,415 A * | 7/1980 | Kanemasa et al. .......... 708/306 |
| 5,847,978 A * | 12/1998 | Ogura et al. ................ 708/552 |
| 5,889,689 A | 3/1999 | Alidina et al. ......... 364/745.03 |
| 6,182,105 B1 | 1/2001 | Kolagotla et al. ........... 708/552 |
| 6,209,017 B1 * | 3/2001 | Lim et al. .................... 708/552 |
| 6,499,046 B1 * | 12/2002 | Nguyen et al. ............. 708/552 |
| 6,519,620 B1 * | 2/2003 | Nguyen et al. ............. 708/552 |

* cited by examiner

*Primary Examiner*—David H. Malzahn
(74) *Attorney, Agent, or Firm*—Lisa K. Jorgenson; Dennis M. de Guzman; Seed IP Law Group PLLC

(57) ABSTRACT

A method for determining, by means of a circuit, a result $s_{k+2}$ of an operation of the type $$s_{k+2} = \left(s_k \overset{+}{\circ} a_k\right) \overset{+}{\circ} a_{k+1}$$

where $s_k$, $a_k$, and $a_{k+1}$ are fractional signed operands and symbol $$\overset{+}{\circ}$$

represents a saturating addition operation, comprising: a step of calculation of three sums representative of a possible value of the result, and a step of selection of one of said three sums according to overflows having occurred in the sum calculation. At least one step of the method uses the positive part and the negative part of at least one of the operands.

14 Claims, 3 Drawing Sheets

$$s_2 = (x_1 \times y_1) + s_1$$
$$s_3 = (x_2 \times y_2) + s_2$$
$$s_4 = (x_3 \times y_3) + s_3$$

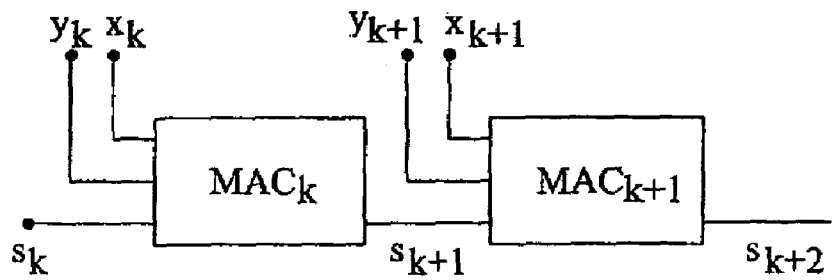
Fig 2A
Prior Art
$$s_{k+1} = (x_k \times y_k) + s_k$$
$$s_{k+2} = (x_{k+1} \times y_{k+1}) + s_{k+1}$$
$$s_{k+2} = (x_{k+1} \times y_{k+1}) + [(x_k \times y_k) + s_k]$$
$$\left. \begin{array}{l} s_{k+2} = a_{k+1} + (a_k + s_k) \\ s_{k+2} = (s_k + a_k) + a_{k+1} \end{array} \right\} \text{avec} \quad \begin{array}{l} a_k = x_k \times y_k \\ a_{k+1} = x_{k+1} \times y_{k+1} \end{array}$$
Fig 2B
Prior Art
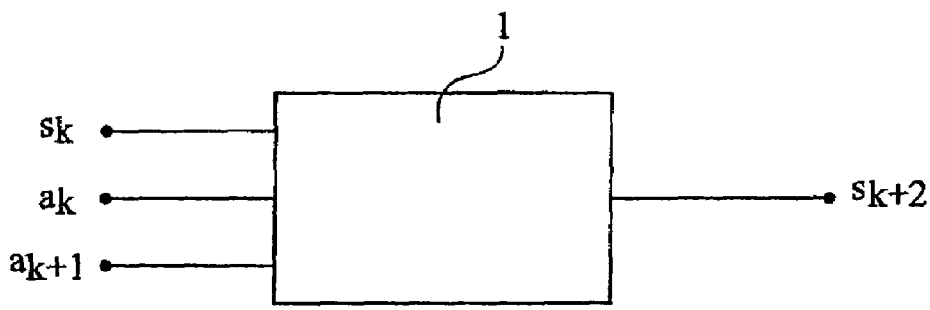
Fig 2C
Prior Art

HIGH-EFFICIENCY SATURATING OPERATOR

BACKGROUND OF THE INVENTION

1. Field of the Invention

The present invention generally relates to the processing of digital signals and more specifically to saturating operators.

2. Description of the Related Art

Such operators have an important technical effect. They are used in many signal processing circuits, for example, in mobile phone voice encoding or decoding circuits, where the coding and decoding algorithms use fractional signed numbers.

Fractional signed numbers are numbers ranging between −1 and +1, generally coded over n bits. These numbers are signed, the bit of rank n (most significant bit) being equal to 1 for negative numbers and to 0 for positive numbers. Precisely, the value assigned to a fractional number of n bits is the value of the corresponding integer in two's complement, divided by $2^{n-1}$.

The fractional representation is a means enabling use of calculation units which operate on integers. This results in circuits easier to form at the hardware level than circuits using floating point arithmetics. These circuits also use less memory and consume less power.

A so-called "saturating" operator is an operator performing saturating operations, for example, saturating additions and multiplications.

A saturating operation, which will be designated hereafter with symbol $$\overset{+}{\circ},$$

is an addition of two fractional signed numbers, the result of which is a fractional signed number. This means that if one of the limiting values of the fractional representation is exceeded in the addition, the result is brought to the exceeded limiting value. Thus, if the saturating addition of two signed fractional numbers coded over n bits provides a result greater than 1, said result is brought down to the maximum value that can be taken by a signed fractional number coded over n bits, that is, $1-2^{-n+1}$. Similarly, if the result of a saturating addition is smaller than −1, the result of the addition is brought up to the minimum number that can be represented by means of n bits in a fractional representation of signed numbers, that is, −1.

Similarly, a saturating multiplication, here designated with symbol $$\overset{\times}{\circ},$$

is a multiplication the result of which belongs to the field of fractional signed numbers to which the operands belong. If the result of the multiplication exceeds one of the two limiting values of this representation, it is brought to the exceeded limiting value.

The saturating addition and multiplication are both commutative, but not associative.

A device such as a mobile phone is comprised of a microcontroller, of digital signal processors DSP, and of dedicated hardware blocks DHB. The digital signal processors and the dedicated hardware blocks are used to form a great number of various functions, for example, encryption, Fourier transform calculations, MPEG coding, etc. Many digital processings must further be accurate to within one bit. This means that the processing of a sequence of reference digital samples in a device must provide the same digital sequence as a reference algorithm for the device to be certified, standards bodies, such as the ITU (International Telecommunication Union) or the ETSI (European Telecommunications Standard Institute) being in charge of providing the reference samples/algorithms and of certifying the devices.

To provide an exact result to within one bit, a digital signal processor or a dedicated hardware block generally is comprised of many circuits of MAC (Multiply Accumulate Operator) type.

FIG. 1A shows a sequence of three operators of MAC type in series, MAC1, MAC2, and MAC3. Operator MAC1 receives on three input terminals three operands $x_1$, $y_1$, and $s_1$. In a known manner, operator MAC1 provides a result:

$$s_2 = \left(x_1 \overset{x}{\circ} y_1\right) \overset{+}{\circ} s_1.$$

The second operator, MAC2, receives two operands $x_2$, $y_2$, as well as result $s_2$ of operator MAC1. It provides a result equal to:

$$s_3 = \left(x_2 \overset{x}{\circ} y_2\right) \overset{+}{\circ} s_2.$$

The third operator, MAC3, receives two operands $x_3$ and $y_3$, as well as the result $s_3$ of operator MAC2. Operator MAC3 provides a result $s_4$ equal to:

$$s_4 = \left(x_3 \overset{x}{\circ} y_3\right) \overset{+}{\circ} s_3.$$

The expressions of results $s_2$, $s_3$, and $s_4$ are shown in FIG. 1B.

The number of calculations requiring operators of MAC type is generally very high. To gain space and processing time, it is known to gather the operators by two as illustrated in relation with FIGS. 2A to 2C.

FIG. 2A shows two operators of MAC type, $MAC_k$ and $MAC_{k+1}$, connected one after the other. Operator $MAC_k$ receives operands $x_k$ and $y_k$ and an operand $s_k$ coming from the preceding operator. Operator $MAC_k$ provides a result $s_{k+1}$ equal to:

$$s_{k+1} = \left(x_k \overset{x}{\circ} y_k\right) \overset{+}{\circ} s_k.$$

Operator $MAC_{k+1}$ receives operands $x_{k+1}$, $y_{k+1}$ and $s_{k+1}$. It provides a result $s_{k+2}$ equal to:

$$s_{k+2} = \left(x_{k+1} \overset{x}{\circ} y_{k+1}\right) \overset{+}{\circ} s_{k+1}.$$

As can be seen in FIG. 2B, which shows the expressions of $s_{k+1}$ and $s_{k+2}$, $s_{k+2}$ is equal to $$s_{k+2} = \left(x_{k+1} \overset{x}{\circ} y_{k+1}\right) \overset{+}{\circ} \left[\left(x_k \overset{x}{\circ} y_k\right) \overset{+}{\circ} s_k\right].$$

Taking $$a_k = x_k \overset{x}{\circ} y_k \text{ and}$$

$$a_{k+1} = x_{k+1} \overset{x}{\circ} y_{k+1}, s_{k+2} = a_{k+1} \overset{+}{\circ} \left(a_k \overset{+}{\circ} s_k\right)$$

is obtained. One also has $$s_{k+2} = \left(s_k \overset{+}{\circ} a_k\right) \overset{+}{\circ} a_{k+1}, \text{ since operation } \overset{+}{\circ}$$

is commutative.

The two operators $MAC_k$ and $MAC_{k+1}$ can thus be replaced with a circuit 1 shown in FIG. 2C, receiving as an input three operands, $a_k$, $a_{k+1}$, and $s_k$. $a_k$ corresponds to the saturating multiplication of operands $x_k$ and $y_k$, $a_{k+1}$ corresponds to the saturating multiplication of operators $x_{k+1}$ and $y_{k+1}$, and $s_k$ corresponds to the result of the preceding circuit. Circuit 1 provides a result $s_{k+2}$ equal $$\left(s_k \overset{+}{\circ} a_k\right) \overset{+}{\circ} a_{k+1}.$$

The operations providing operands $a_k$ and $a_{k+1}$ are executed outside of circuit 1.

A problem of known circuits of this type is that they perform complex processing steps and require significant hardware elements.

Thus, in prior art, one way of calculating sum $$s_{k+2} = \left(s_k \overset{+}{\circ} a_k\right) \overset{+}{\circ} a_{k+1}$$

is the following. The usual non-saturating sum of $s_k$ and $a_k$ is first calculated. Then, it is checked whether a saturation has occurred by means of an overflow circuit. If an upward overflow has occurred, the result of sum $s_k+a_k$ is replaced with the maximum fractional number and if a downward overflow has occurred, the result of the sum is replaced with the minimum fractional number. Then, the normal addition of the obtained result with $a_{k+1}$ is performed. Again, it is checked whether the result of the addition exceeds the limiting values allowed by the fractional representation and, if necessary, the necessary replacements are performed. In addition to the above-mentioned disadvantages, the calculation steps are long and require evaluating twice the upward and downward overflow of the result of an operation.

BRIEF SUMMARY OF THE INVENTION

An embodiment of the present invention provides a method and a circuit for performing operation $$s_{k+2} = \left(s_k \overset{+}{\circ} a_k\right) \overset{+}{\circ} a_{k+1}$$

with a reduced number of hardware elements.

Another embodiment of the present invention provides a method and a circuit for performing operation $$s_{k+2} = \left(s_k \overset{+}{\circ} a_k\right) \overset{+}{\circ} a_{k+1}$$

in a particularly fast manner.

Another embodiment of the present invention provides a fast circuit of MAC type comprising a reduced number of hardware elements.

An embodiment of the present invention provides a method for determining, by means of a circuit, a result $s_{k+2}$ of an operation of the type $$s_{k+2} = \left(s_k \overset{+}{\circ} a_k\right) \overset{+}{\circ} a_{k+1}$$

where $s_k$, $a_k$, and $a_{k+1}$ are fractional signed operands and symbol $$\overset{+}{\circ}$$

represents a saturating addition operation, that is, an addition in which the result is brought, if necessary, to a limiting value allowed by the fractional representation in case this limiting value is exceeded, comprising:

a step of calculation of three sums representative of a possible value of the result, and a step of selection of one of said three sums according to overflows having occurred in the sum calculation.

At least one step of the method uses the positive part and the negative part of at least one of the operands, the positive part of an operand being defined as being equal to the operand if the operand is a positive number and to zero otherwise, the negative part of an operand being defined as being equal to the operand if the operand is a negative number and to zero otherwise.

According to an embodiment of the present invention, the step of calculation of said three sums comprises:

the calculation of a first sum defined by $$s = s_k + a_k + a_{k+1}$$

the calculation of a second sum defined by $$s' = \max n + a^-_{k+1}, \text{ and}$$

the calculation of a third sum defined by $$s'' = \min n + a^+_{k+1}$$

max n being the value of the maximum fractional signed number, min n being the value of the minimum fractional signed number, $a^+_{k+1}$ being the positive part of operand $a_{k+1}$ and $a^-_{k+1}$ being the negative part of operand $a_{k+1}$.

According to an embodiment of the present invention, the selection step comprises a step of calculation of a first indicator and of a second indicator, the first indicator being equal to a first value if $s_k+a_k+a_{k+1}>$max n+$a^-_{k+1}$ and equal to a second value otherwise, and the second indicator being equal to a third value if $s_k+a_k+a_{k+1}<$min n+$a^+_{k+1}$ and equal to a fourth value otherwise.

According to an embodiment of the present invention, the selection step provides a result $s_{k+2}$ equal:

to the second sum if the first indicator is equal to said first value, to the third sum if the second indicator is equal to said third value, and to the first sum in all other cases.

According to an embodiment of the present invention, the step of calculation of the sums and the step of calculation of the first and second indicators are performed in parallel.

One embodiment of the present invention also relates to a circuit for determining a result $s_{k+2}$ of an operation of the type $$s_{k+2} = (s_k \underset{\circ}{+} a_k) \underset{\circ}{+} a_{k+1}$$

where $s_k$, $a_k$, and $a_{k+1}$ respectively are first, second, and third operands represented in the form of signed fractional numbers coded over n bits, comprising:

a first means for determining the positive and negative parts of the third operand, a second means for calculating a first sum equal to the sum of the first, second, and third operands, a second sum equal to the sum of the negative part of the third operand and of the maximum signed fractional number coded over n bits, and a third sum equal to the sum of the positive part of the third operand and of the minimum fractional signed number coded over n bits, a third means for calculating a first and a second indicators, the first indicator being equal to a first value if $s_k+a_k+a_{k+1}>$max n+$a^-_{k+1}$ and equal to a second value otherwise, the second indicator being equal to a third value if $s_k+a_k+a_{k+1}<$min n+$a^+_{k+1}$ and equal to a fourth value otherwise, max n being the value of the maximum fractional signed number coded over n bits, min n being the value of the minimum fractional signed number coded over n bits, $a^+_{k+1}$ being the positive part of the third operand and $a^-_{k+1}$ being the negative part of the third operand, and a fourth means for providing the first sum if the first indicator is equal to said first value, providing the second sum if the second indicator is equal to said third value, and providing the third sum in the other cases.

According to an embodiment of the present invention, the first means comprises:

an AND gate supplied by the third operand and the inverse of the sign bit replicated n times of the third operand for providing the positive part of the third operand, and an AND gate supplied by the third operand and the inverse of the sign bit replicated n times of the third operand for providing the negative part of the third operand.

According to an embodiment of the present invention, the second means comprises:

a first adder receiving the first, second, and third operands and providing said first sum, a second adder providing said second sum and receiving the negative part of the third operand and the value of the maximum fractional signed number coded over n bits, and a third adder providing said third sum and receiving the positive part of the third operand and the value of the minimum fractional signed number coded over n bits, and the fourth means comprises a multiplexer receiving said first, second, and third sums and providing result $s_{k+2}$ of the operation, the multiplexer being controlled by the first and second indicators.

According to an embodiment of the present invention, the third means comprises:

a fourth adder receiving the first operand, the second operand, and the positive part of the third operand, a unit for indicating an upward overflow receiving the result of the fourth adder and providing the first indicator, a fifth adder receiving the first operand, the second operand, and the negative part of the third operand, and a unit for indicating a downward overflow receiving the result of the fifth adder and providing the second indicator.

An embodiment of the present invention also relates to a unit performing a function of MAC type using an above method or comprising an above circuit.

The foregoing features of the present invention will be discussed in detail in the following non-limiting description of specific embodiments in connection with the accompanying drawings.

BRIEF DESCRIPTION OF THE SEVERAL VIEWS OF THE DRAWINGS

FIG. 2A, previously described, shows two MAC-type circuits in series;

FIG. 2B illustrates the functions of the circuits of FIG. 2A;

FIG. 2C, previously described, shows a circuit used to replace the two circuits of FIG. 2A.

DETAILED DESCRIPTION OF THE INVENTION

Embodiments of a high-efficiency saturating operator are described herein. In the following description, numerous specific details are given to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

To perform operation $$s_{k+2} = (s_k \; \overset{+}{_\circ} \; a_k) \; \overset{+}{_\circ} \; a_{k+1},$$

an embodiment of the present invention uses the positive and negative parts of one at least of the operands.

It should be reminded that, by definition, the positive part of number $a_k$, designated as $a^+_k$, is equal to $a_k$ if $a_k$ is positive or zero and equal to zero if $a_k$ is negative or zero. The negative part of $a_k$, designated as $a^-_k$, is equal to $a_k$ if $a_k$ is negative or zero and equal to zero if $a_k$ is positive or zero. A property of the positive and negative parts of a number $a_k$ is that $a^+_k + a^-_k = a_k$.

The positive and negative parts are calculated in a very simple way from the number and its sign bit, as described hereafter. The use of the positive and negative parts of an operand will remarkably simplify the circuit performing the operation. Further, in an embodiment of the present invention, conventional overflow circuits are not used.

In one embodiment of the present invention, three sums are calculated in parallel, each sum being representative of a possible value of result $s_{k+2}$. Simultaneously to the calculation of the three sums, two indicators S' and S", the calculation of which is much simpler than a limiting value overflow calculation, are determined. The choice of the final result is obtained by selecting one of the three calculated sums according to the value of indicators S' and S". The calculation of the indicators is performed in parallel with the sum calculation. The obtaining of the result is very fast, shorter than one clock cycle.

Figures 1A, 1B:
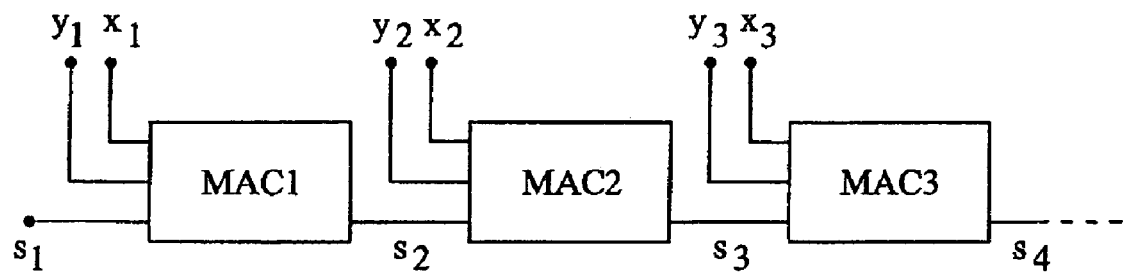
FIG. 1A, previously described, shows a series of MAC-type circuits used in a signal processing.
FIG. 1B illustrates the functions implemented by the circuits of FIG. 1A.
Figure 3:
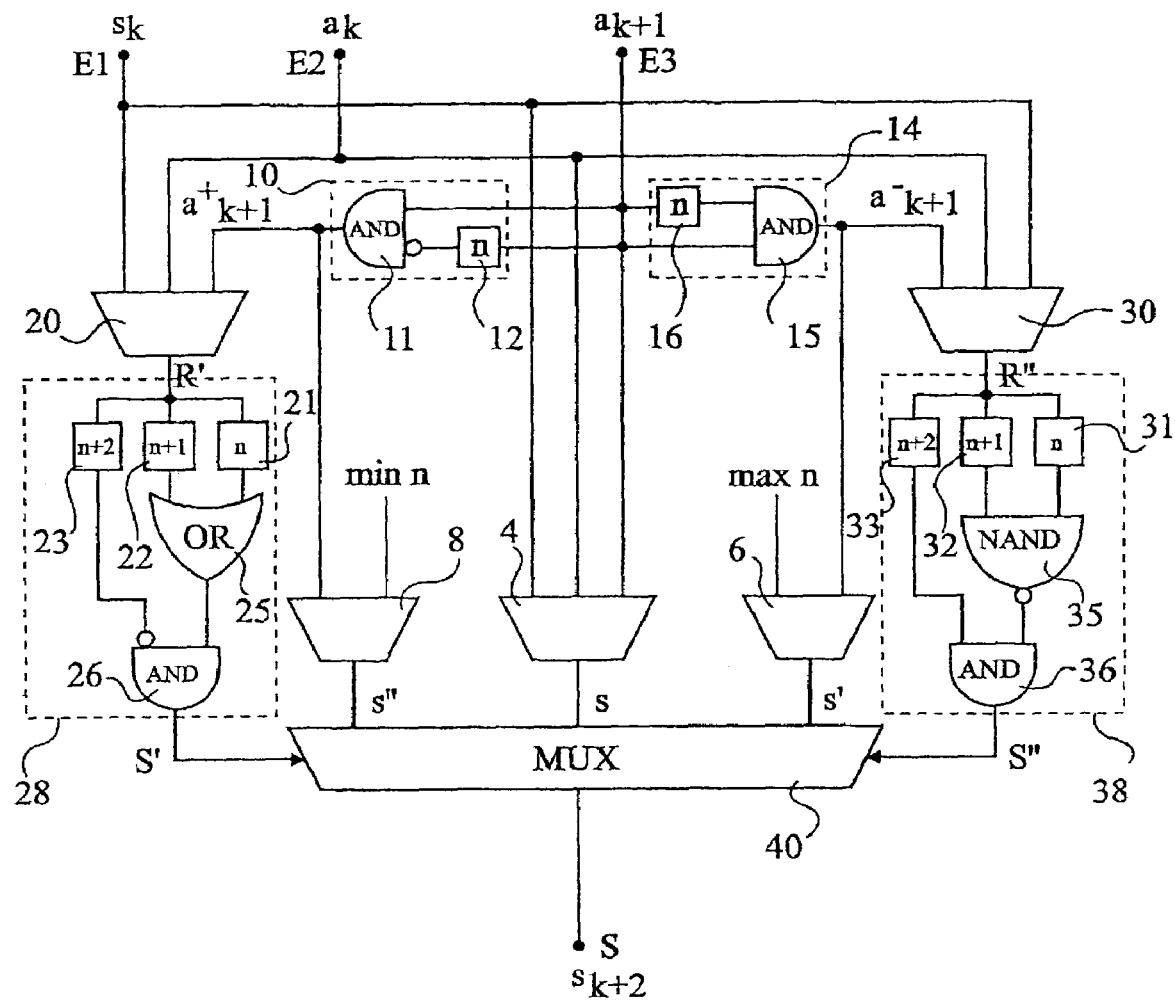
FIG. 3 shows a circuit according to an embodiment of the present invention.

FIG. 3 shows a circuit for providing the result of an operation of the type $$s_{k+2} = (s_k \; \overset{+}{_\circ} \; a_k) \; \overset{+}{_\circ} \; a_{k+1}.$$

The circuit has three inputs E1, E2, E3, respectively receiving three operands $s_k$, $a_k$, and $a_{k+1}$. The circuit has an output S, providing result $s_{k+2}$ of the operation. Operands $s_k$, $a_k$, and $a_{k+1}$, as well as result $s_{k+2}$, are signed fractional numbers coded over n bits.

The circuit comprises three adders 4, 6, and 8. Adder 4 is a three-input adder, each of the inputs receiving one of the three operands $a_k$, $a_{k+1}$, and $s_k$. It provides a sum s equal to $s_k + a_k + a_{k+1}$. Adder 6 is a two-input adder. On one of its inputs, it receives the maximum limiting value, max n, which corresponds to the maximum signed fractional number that can be represented over n bits. The other input of adder 6 receives negative part $a^-_{k+1}$ of the third operand. Adder 6 provides sum s' equal to max $n + a^-_{k+1}$. Adder 8 is a two-input adder. On one of its inputs, it receives the minimum limiting value of the used fractional representation, min n. On the other input, it receives positive part $a^+_{k+1}$ of third operand $a_{k+1}$. Adder 8 outputs a sum s" equal to min $n + a^+_{k+1}$. In practice, the circuit providing an output over n bits, only the n least significant bits of sums s, s', and s" can be used hereafter. The n least significant bits of sums s, s', and s" can be obtained by simple truncating at the level of adders 4, 6, and 8, or subsequently.

Values min n and max n, respectively provided to adders 8 and 6, can be stored or determined internally to the circuit. They can also be provided to the circuit, especially in the case where the circuit is parameterizable and provided to operate with operands coded over different numbers of bits according to the applications.

Positive part $a^+_{k+1}$ of operator $a_{k+1}$ is determined by a unit 10. Unit 10 is formed of a sign extraction unit 12 and of an AND-type gate 11 over n bits, one input of which is inverting. The non-inverting input of gate 11 receives third operand $a_{k+1}$. On its inverting input, gate 11 receives the sign bit replicated n times of operand $a_{k+1}$. This bit is provided by unit 12, which receives operand $a_{k+1}$ and replicates n times the most significant bit thereof, of rank n. The output of gate 11 provides positive part $a^+_{k+1}$ of operand $a_{k+1}$.

Negative part $a^-_{k+1}$ of operand $a_{k+1}$ is determined by a unit 14. Unit 14 comprises an AND-type gate 15 and a sign extraction unit 16. Unit 16 receives third operand $a_{k+1}$ and replicates its most significant bit, representing the sign of the operand, n times. Gate 15 receives on one input the sign bit replicated n times of operand $a_{k+1}$, provided by unit 16, and on the other input operand $a_{k+1}$. The output of gate 15 provide negative part $a^-_{k+1}$ of the third operand.

At the same time as sums s, s', and s" are determined, the circuit calculates two indicators S' and S", the value of which enables selection of the sum corresponding to the result.

The calculation of indicator S' is performed as follows. A three-input adder 20 receives first operand $s_k$, second operand $a_k$, and the positive part of third operand $a^+_{k+1}$. It provides sum R' of the three operands. Since each of the operands is coded over n bits, result R' is provided over n+2 bits. Result R' is provided to three bit extraction units 21, 22, and 23. Unit 21 provides the n-th bit of result R'. Unit 22 provides the bit of rank n+1 of result R'. Unit 23 provides the bit of rank n+2 of result R'. The outputs of units 21 and 22 supply an OR-type gate 25. The output of gate 25 supplies a non-inverting input of an AND-type gate 26. Gate 26 comprises two inputs, a non-inverting and an inverting input. The inverting input of gate 26 receives the bit of rank n+2 of result R' provided by unit 23. The output of gate 26 provides indicator S', which is equal to 1 only if the bit of rank n+2 of result R' is equal to 0 and one of the two bits of rank n or n+1 of result R' is equal to 1. It is demonstrated that indicator S' is equal to 1 if $s_k + a_k + a_{k+1} > $ max $n + a^-_{k+1}$, which is equivalent to $s_k + a_k + a^+_{k+1} > $ max n. Indicator S' is equal to 0 otherwise. The assembly of units 21, 22, 23 and of gates 25 and 26 forms a unit 28 indicating an upward overflow only and is particularly simple to form.

The calculation of indicator S" is performed as follows. A three-input adder 30 receives first operand $s_k$, second operand $a_k$, and the negative part of the third operand, $a^-_{k+1}$. Adder 30 provides, over n+2 bits, a result R" equal to the sum of the three signals present on its inputs. The adder output drives three bit-extracting units 31, 32, and 33. Unit 31 provides a bit of rank n of result R". Unit 32 provides the bit of rank n+1 of result R" and unit 33 provides the bit of rank n+2 of result R". The outputs of units 31 and 32 drive a NAND gate 35. The output of gate 35 drives an input of a two-input AND-type gate 36 receiving, on its other input, the bit of rank n+2 of result R", provided by unit 33. The output of gate 36 provides second indicator S", which is equal to 1 only if the bit of rank n+2 of result R" is equal to 1 and one of the two bits of rank n or n+1 is equal to zero. It is demonstrated that indicator S" is equal to 1 if $s_k + a_k + a_{k+1} < $ min $n + a^+_{k+1}$, which is equivalent to $s_k + a_k + a^-_{k+1} < $ min n. Indicator S" is equal to 0 otherwise. The assembly of units 31, 32, 33 and of gates 35 and 36 forms a unit 38 indicating a downward overflow only and is particularly simple to form.

The output of gate 26 is connected to a first control input of a multiplexer 40 and the output of gate 36 is connected to a second control input of multiplexer 40. Multiplexer 40 comprises three inputs, respectively receiving sums s, s' and s", possibly the n least significant bits of these sums. Indicators S' and S" control multiplexer 40 so that the multiplexer selects sum s' and provides the n least significant bits of this sum if indicator S' is equal to 1. Multiplexer 40 selects sum s" and provides the n least significant bits of this sum if indicator S" is equal to 1. In the other cases, the multiplexer provides the n least significant bits of sum s. The multiplexer output is connected to output S of the circuit. It should be noted that indicators S' and S" cannot be equal to 1 at the same time.

The circuit of FIG. 3 is particularly advantageous since it uses few elements. For example, it uses a single multiplexer 40. Further, one of the prior art problems solved by the present invention relates to overflow circuits. Indeed, in the present invention, not only is the use of conventional overflow units, calculating both an upward and a downward overflow, avoided, but also is the calculation of indicators S' and S", indicating either an upward overflow or a downward overflow, performed simultaneously to the sum calculation, without having to wait for the result of the sums. The circuit simplification and the time gain are significant. In embodiments using CMOS electronic circuits, it is possible to significantly decrease the electric consumption by lowering the supply voltage, at the cost of an increase in propagation delays. The time gain introduced by the circuit can thus be exploited to decrease the electric consumption.

It should also be noted that the elements used in the circuit are extremely fast. All the calculations can be provided in less than one clock cycle. The insertion of such a circuit in a digital signal processor or a dedicated hardware block enables significant improvement of the performances in many applications, especially applications where the processing must be performed with a precision to within one bit. Indeed, the use of this circuit enables adding with saturation twice as many operands per cycle than in the case where conventional saturating adders are used.

n, namely the number of bits on which the operands are coded, may have any value. For example, n may be equal to 32.

Of course, the present invention is likely to have various alterations, modifications, and improvements which will readily occur to those skilled in the art. For example, one or several elements forming the described circuit may be replaced with other elements generally performing the same function.

It should further be noted that the field of the present invention extends to any circuit or method comprising an operator performing operation $$s_{k+2} = \left(s_k \overset{+}{\circ} a_k\right) \overset{+}{\circ} a_{k+1}$$

according to the present invention. For example, the circuit of an embodiment of the present invention may be easily completed to implement the function of a MAC-type circuit, the calculation of operands $a_k$ and $a_{k+1}$ being integrated to the circuit.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

What is claimed is:

1. A circuit for determining a result ($s_{k+2}$) of an operation of a type $$s_{k+2} = \left(s_k \overset{+}{\circ} a_k\right) \overset{+}{\circ} a_{k+1},$$

where $s_k$, $a_k$, and $a_{k+1}$ respectively are first, second, and third operands represented in a form of signed fractional numbers coded over n bits, the circuit comprising:

first means for determining a positive and negative parts of the third operand ($a_{k+1}$);

second means for calculating a first sum (s) equal to the sum of the first, second, and third operands ($s_k$, $a_k$, $a_{k+1}$), a second sum (s') equal to a sum of the negative part of the third operand and of a maximum signed fractional number coded over n bits, and a third sum (s") equal to the sum of the positive part of the third operand and of a minimum fractional signed number coded over n bits;

third means for calculating a first (S') and a second (S") indicators, the first indicator (S') being equal to a first value if $s_k+a_k+a_{k+1}>$max n$+a^-_{k+1}$ and equal to a second value otherwise, the second indicator (S") being equal to a third value if $s_k+a_k+a_{k+1}<$min n$+a^+_{k+1}$ and equal to a fourth value otherwise, max n being a value of the maximum fractional signed number coded over n bits, min n being a value of the minimum fractional signed number coded over n bits, $a^+_{k+1}$ being the positive part of the third operand ($a_{k+1}$) and $a^-_{k+1}$ being the negative part of the third operand ($a_{k+1}$); and fourth means for providing the first sum if the first indicator is equal to said first value, providing the second sum if the second indicator is equal to said third value, and providing the third sum in the other cases.

2. The circuit of claim 1 wherein the first means comprise:

an AND gate supplied by the third operand ($a_{k+1}$) and an inverse of a sign bit replicated n times of the third operand for providing the positive part of the third operand ($a^+_{k+1}$); and an AND gate supplied by the third operand ($a_{k+1}$) and the inverse of the sign bit replicated n times of the third operand for providing the negative part of the third operand ($a^-_{k+1}$).

3. The circuit of claim 1 wherein the second means comprise:

a first adder for receiving the first, second, and third operands and providing said first sum (s);

a second adder for providing said second sum (s') and receiving the negative part ($a^-_{k+1}$) of the third operand and the value of the maximum fractional signed number coded over n bits (max n); and a third adder for providing said third sum (s") and receiving the positive part of the third operand ($a^+_{k+1}$) and the value of the minimum fractional signed number coded over n bits (min n), and wherein the fourth means comprises a multiplexer for receiving said first, second, and third sums and providing result $s_{k+2}$ of the operation, the multiplexer being controlled by the first and second indicators.

4. The circuit of claim 1 wherein the third means comprise:
a fourth adder receiving the first operand, the second operand, and the positive part of the third operand;
a unit for indicating an upward overflow receiving a result of the fourth adder and providing the first indicator;
a fifth adder receiving the first operand, the second operand, and the negative part of the third operand; and
a unit for indicating a downward overflow receiving a result of the fifth adder and providing the second indicator.

5. The circuit of claim 1 wherein said first, second, third, and fourth means comprise part of a mobile communication device.

6. The circuit of claim 1 wherein said first, second, third, and fourth means comprise part of a multiply accumulate operator (MAC)-type unit.

7. An apparatus to determine a result ($s_{k+2}$) of an operation of a type $$s_{k+2} = \left(s_k + a_k\right) + a_{k+1},$$

where $s_k$, $a_k$, and $a_{k+1}$ respectively are first, second, and third operands represented in a form of signed fractional numbers coded over n bits, the apparatus comprising:
first and second circuit blocks to respectively determine positive and negative parts of the third operand ($s_{k+1}$);
first, second, and third components coupled to the first and second circuit blocks to respectively calculate: a first sum equal to a sum of the first, second, and third operands ($s_k$, $a_k$, $a_{k+1}$); a second sum (s') equal to a sum of the negative part of the third operand and of a maximum signed fractional number coded over n bits; and a third sum (s") equal to a sum of the positive part of the third operand and of a minimum fractional signed number coded over n bits;
a third circuit block coupled to the first circuit block to calculate a first (S') indicator and a fourth circuit block coupled to the second circuit block to calculate a second (S") indicator, the first indicator (S') being equal to a first value if $s_k+a_k+a_{k+1}>$max n+$a^-_{k+1}$ and equal to a second value otherwise, the second indicator (S") being equal to a third value if $s_k+a_k+a_{k+1} <$min n +$a^+_{k+1}$ and equal to a fourth value otherwise, max n being a value of the maximum fractional signed number coded over n bits, mm n being a value of the minimum fractional signed number coded over n bits, all being the positive part of the third operand ($a_{k+1}$) and $a^-_{k+1}$ being the negative part of the third operand ($a_{k+1}$); and
a fourth component coupled to the third and fourth circuit blocks to provide the first sum if the first indicator is equal to said first value, to provide the second sum if the second indicator is equal to said third value, and to provide the third sum in the other cases.

8. The apparatus of claim 7 wherein the first circuit block includes a logic gate coupled to receive the third operand and an inverse of a sign bit replicated n times of the third operand, and wherein the second circuit block includes another logic gate coupled to receive the third operand and the inverse of the sign bit replicated n times of the third operand.

9. The apparatus of claim 7 wherein the first, second, and third components include adders.

10. The apparatus of claim 7 wherein the fourth component comprises a multiplexer.

11. The apparatus of claim 7 wherein the third circuit block includes:
a first adder coupled to receive the first operand, the second operand, and the positive part of the third operand; and
a first unit coupled to the first adder to indicate an upward overflow and to receive a result of the fourth adder.

12. The apparatus of claim 11 wherein the fourth circuit block includes:
a second adder coupled to receive the first operand, the second operand, and the negative part of the third operand; and
a second unit coupled to the second adder to indicate a downward overflow and to receive a result of the fifth adder.

13. The apparatus of claim 7 wherein the first, second, and third circuit blocks and the first, second, third, and fourth components comprise part of a mobile communication device.

14. The apparatus of claim 7 wherein the first, second, and third circuit blocks and the first, second, third, and fourth components comprise part of a multiply accumulate operator (MAC)-type unit.

* * * * *